(12) United States Patent
Miyauchi et al.

(10) Patent No.: US 8,159,087 B2
(45) Date of Patent: Apr. 17, 2012

(54) POWER GENERATION SYSTEM AND OPERATION METHOD THEREOF

(75) Inventors: Shinji Miyauchi, Nara (JP); Motomichi Katou, Nara (JP); Yasuhiro Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 236 days.

(21) Appl. No.: 12/523,447

(22) PCT Filed: Feb. 19, 2008

(86) PCT No.: PCT/JP2008/000259
§ 371 (c)(1),
(2), (4) Date: Jul. 16, 2009

(87) PCT Pub. No.: WO2008/102542
PCT Pub. Date: Aug. 28, 2008

(65) Prior Publication Data
US 2010/0096927 A1    Apr. 22, 2010

(30) Foreign Application Priority Data
Feb. 20, 2007 (JP) ................. 2007-038897

(51) Int. Cl.
*H02J 9/00* (2006.01)
(52) U.S. Cl. .......... 307/64; 307/43; 307/65; 307/80; 429/23

(58) Field of Classification Search ........... 307/25–26, 307/57–59, 72–75, 82, 87, 116, 125, 126, 307/128, 131; 429/9, 13, 20–21, 23; 320/101
See application file for complete search history.

(56) References Cited

U.S. PATENT DOCUMENTS

| | | | | |
|---|---|---|---|---|
| 2005/0198963 | A1* | 9/2005 | Wai et al. | 60/698 |
| 2005/0271916 | A1* | 12/2005 | Yang et al. | 429/20 |
| 2006/0029846 | A1* | 2/2006 | Konoto et al. | 429/23 |
| 2006/0078773 | A1* | 4/2006 | Speranza et al. | 429/23 |

FOREIGN PATENT DOCUMENTS

| | | |
|---|---|---|
| JP | 2003-244868 | 8/2003 |
| JP | 2004-213985 | 7/2004 |
| JP | 2006-012563 | 1/2006 |
| JP | 2006-067757 | 3/2006 |

* cited by examiner

*Primary Examiner* — Jared Fureman
*Assistant Examiner* — Alfonso Perez Borroto
(74) *Attorney, Agent, or Firm* — McDermott Will & Emery LLP (57) ABSTRACT

The invention provides a power generation system having a power generator (1) configured to generate DC power; an electric power load (5); a current detector configured to detect a current flowing between a system power supply (8) and an interconnection point (9); and a switch (4) configured to switch to supply the DC power from the power generator (1) and AC power which is fed from the system power supply (8) through the interconnection point (9), to the electric power load (5).

16 Claims, 6 Drawing Sheets

POWER GENERATION SYSTEM AND OPERATION METHOD THEREOF

RELATED APPLICATIONS

This application is the U.S. National Phase under 35 U.S.C. § 371 of International Application No. PCT/JP2008/000259, filed on Feb. 19, 2008, which in turn claims the benefit of Japanese Application No. 2007-038897, filed on Feb. 20, 2007, the disclosures of which Applications are incorporated by reference herein.

TECHNICAL FIELD

The present invention relates to a power generation system and an operation method thereof, the power generation system having a power generator for generating DC power; an internal electric power load; and a current detector for detecting a current flowing between a system power supply and an interconnection point. More particularly, the present invention relates to a power generation system and an operation method thereof, the power generation system having a switch for performing switching between DC power from the power generator and AC power from the system power supply to selectively feed to the internal electric power load.

BACKGROUND ART

Typical power generation systems, which are designed to generate DC power by means of a power generator such as a fuel cell and convert the DC power into AC power by means of an electric power convertor such as an inverter, are used being interconnected to a system power supply. In the power generation systems embodied in such a form, electric power generated by the power generator and electric power transmitted from the system power supply are supplied to an external electric power load (e.g., home electric power).

Power generators such as fuel cells for generating DC power are slow in the speed of changing the output rate in accordance with load variations in the external electric power load. Therefore, surplus electric power is generated, causing reverse power flow toward the system power supply, in cases where the total power consumption of all the appliances supplied with power from the power generation system is lower than the output power of the power generation system. There have been known power generation systems capable of preventing or mitigating the reverse power flow (see Patent Document 1 and Patent Document 2).

According to the power generation system disclosed in Patent Document 1, in a case where the output of the inverter is stopped when surplus electric power is generated, a system interconnection failure occurs, etc, the DC power generated in the power generator is supplied to a DC power load through a first DC/DC convertor arranged in parallel with the inverter to consume the surplus electric power. In this way, reverse power flow can be prevented in a case where the output of the inverter is stopped when surplus electric power is generated, a system interconnection failure occurs, etc.

Figure 4:
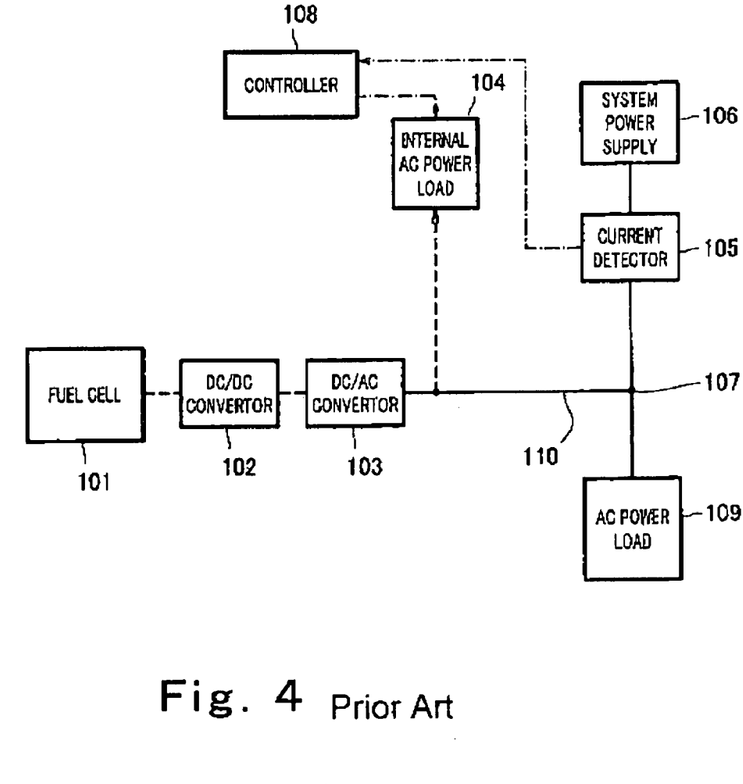
FIG. 4 is a block diagram schematically showing the configuration of a conventional power generation system.

In the fuel cell system disclosed in Patent Document 2, in the event of an occurrence of surplus electric power, the DC power generated in the fuel cell is supplied to a DC power load connected to an inverter to consume the surplus electric power. FIG. 4 is a block diagram that schematically shows a configuration of the power generation system of Patent Document 2 shown in FIG. 1.

As shown in FIG. 4, this fuel cell system has a fuel cell 101, a DC/DC convertor 102 for receiving and converting DC power from the fuel cell 101, and a DC/AC convertor (inverter) 103 for converting the output of the DC/DC convertor 102 into AC power. The output side of the DC/AC convertor 103 is connected to a system power supply 106 at an interconnection point 107 by a power supply wire 110. Connected to the interconnection point 107 is an external AC power load 109. Connected to the power supply wire 110 is an internal AC power load (heater) 104. That is, the AC power load 104 is connected to the output side from which the AC power derived from the fuel cell 101 of this fuel cell system is output. The electric wire for connecting the system power supply 106 and the interconnection point 107 is provided with a current detector 105 for detecting a current flowing between the system power supply 106 and the interconnection point 107. The current detected by the current detector 105 is input to a controller 108. The controller 108 puts the internal AC power load 104 into operation if the direction of the current detected by the current detector 105 is from the interconnection point 107 to the system power supply 106. As a result, the surplus electric power, which has occurred in the fuel cell 101, is consumed in the form of AC power by the internal AC power load 104, whereby an occurrence of reverse power flow can be prevented.

Patent Document 1: JP-A-2006-67757 (see particularly FIG. 1)

Patent Document 2: JP-A-2006-12563 (see particularly FIG. 1)

DISCLOSURE Of The INVENTION

Problems that the Invention Intends to Solve

In the fuel cell system of Patent Document 2, the controller 108 needs to recognize, in order to detect an occurrence of reverse power flow, that the direction of the current detected by the current detector 105 is the same as a specified direction. The current detector 105 is constituted by a current sensor such as CT and detects the magnitude and direction of an electric current of a detection object. In such a current detector 105, if the direction of the detected current of the detection object is opposite to the direction of the primary detecting element (that is e.g., a detection coil in the case of CT (current transformer)), the direction of the current, that is detection object, is detected as a reverse direction. This is also applied to the power generation system of Patent Document 1. It should be noted that the direction of the primary detecting element is hereinafter referred to as "the orientation of the current detector".

Therefore, when installing a conventional power generation system such as described above, a check is generally made to determine whether the current detector is installed in a specified orientation. This check is made by a technical installation staff in the following way. Concretely, the installation staff connects a desired AC power load to a power supply wire between the interconnection point of the system power supply and the DC/AC convertor. Then, he operates the system power supply to start and stop feeding of electric power to this AC power load while the DC/AC convertor being shut down (gate blocked), and checks the direction of the current detected by the current detector during this period. Thus, such a power generation system disadvantageously involves troublesome installation operation, entailing an increase in the cost.

In the fuel cell system of Patent Document 2, if a system interconnection failure occurs, the DC/AC convertor 103 for converting the DC output of the fuel cell 101 into AC power needs to be gate-blocked to thereby disallow application of the output voltage of the DC/AC convertor 103 to the system power supply 106. This causes the problem that the surplus electric power generated at that time cannot be consumed in the internal AC power load 104 and therefore the system interconnection failure cannot be properly dealt with.

The invention is directed to overcoming the above problem and an object of the invention is therefore to provide a power generation system wherein DC power generated by a power generator is converted into AC power that is in turn output, while the power generation system being interconnected to a system power supply and wherein surplus electric power is supplied to an internal electric power load based on an electric current flowing between the system power supply and an interconnection point, which is detected by a current detector, so that the installation cost of the current detector can be saved.

Means for Solving the Problems

The above object can be achieved by a power generation system according to the invention, the system comprising: a power generator configured to generate DC power; an electric power load; a current detector configured to detect a current flowing between a system power supply and an interconnection point; and a switch configured to switch to supply the DC power from the power generator or AC power which is fed from the system power supply through the interconnection point, to the electric power load. "The DC power from the power generator" stated in the invention means "the DC power derived from the power generator" including both the DC power that comes directly from the power generator and the DC power that comes from the power generator by way of intermediate devices (e.g., the DC/DC convertor).

In the above configuration, reverse power flow or the like can be prevented by switching the switch such that surplus electric power generated in the power generator is supplied to the electric power load to be consumed thereat, and in addition, an installation check for the current detector can be made by switching the switch such that the AC power coming from the system power supply by way of the interconnection point is supplied to the electric power load. Accordingly the electric power load originally provided for use in the consumption of surplus electric power can be used for making an installation check for the current detector. This eliminates the need for provision of the electric power load that is exclusively used for making a current detector installation check in the prior art techniques, so that the cost of the current detector installation check can be reduced. In addition, the surplus electric power generated in the power generator in the form of DC power can be supplied to the electric power load as it is. Therefore, even if the DC/AC convertor for converting the DC output of the power generator into AC power is gate blocked in the event of a system interconnection failure, the surplus electric power generated at that time can be consumed in the electric power load. This makes it possible to adequately deal with a system interconnection failure.

The power generation system may further comprise a controller configured to control an operation of the switch, and the controller may be configured to switch the switch so as to supply the AC power from the system power supply to the electric power load if a direction of the current detected by the current detector is to be determined and to switch the switch so as to supply the DC power from the power generator to the electric power load if surplus electric power has occurred in the power generator. "Switches the switch if surplus electric power has occurred" as stated in the invention means that "the switch has been already switched at the time point when surplus electric power is supplied to the electric power load". It does not necessarily mean that the switch is switched after confirming an occurrence of surplus electric power. The switching of the switch may be carried out at any time before confirmation of an occurrence of surplus electric power, i.e., during the period just before the surplus electric power is supplied to the electric power load after determination of the direction of the current detected by the current detector.

The power generation system may further comprise a first DC/DC convertor configured to receive the DC power from the power generator and to convert a voltage thereof and a DC/AC convertor configured to convert an output of the first DC/DC convertor into AC power and may be formed such that the electric power load is electrically connected to an output side of the first DC/DC convertor through the switch.

The controller may be configured to, upon detection of a current flowing from the interconnection point to the system power supply by the current detector, switch the switch so as to supply the DC power from the power generator to the electric power load.

In the above configuration, since surplus electric power occurring in the power generator can be consumed in the electric power load, upon detection of a current flowing to the system power supply by the current detector, reverse power flow can be prevented.

The controller may is configured to switch the switch so as to supply the AC power from the power system supply to the electric power load and may determine the direction of the current detected by the current detector at that time.

In the above configuration, whether the installation of the current detector is correct can be checked based on the direction of the current detected by the current detector.

The power generation system may further comprise a display device and the controller may be configured to cause the display device to display data relating to the direction of the current that has been determined.

In this configuration, if the current detector is installed in a wrong orientation, the installation staff will be alerted.

The controller may be configured to reverse the direction of the current detected by the current detector and perform control based on the reversed current, if the direction of the current which has been determined is opposite to a preset current direction.

In this configuration, even if the current detector is installed in a wrong orientation, control can be continued without change. This eliminates the need for an operation of correcting the installation of the current detector, which results in a reduction in the installation cost of the current detector.

The power generator may further comprise a heat accumulator configured to store a heat medium that has recovered exhaust heat of the power generator, and the electric power load may be an electric heater for heating the heat medium.

In this configuration, surplus electric power can be effectively utilized so that improved energy saving can be achieved.

The power generator may be a fuel cell system. The controller may is configured to switch the switch so as to supply the AC power from the system power supply to the electric power load and determine the direction of the current detected by the current detector, during a period between a start of a start-up operation of the fuel cell system and a start of power generation.

In this configuration, since the current detector installation check can be made with a timing close to a power generating operation during which reverse power flow is detected based on the direction of the current, an occurrence of a failure due to a trouble in the current detector can be prevented without fail.

The fuel cell system may include a hydrogen generator having a reformer configured to generate a hydrogen-rich reformed gas from a material gas and a CO reducer configured to reduce CO concentration of the reformed gas produced by reforming by the reformer and a fuel cell configured to generate electric power by use of the reformed gas the CO concentration of which has been reduced. The controller may be configured to switch the switch and determine the direction of the current, during a period until the fuel cell starts power generation after the CO concentration of the reformed gas which has been reduced by the CO reducer reaches a specified level.

In this configuration, the current detector installation check can be made just before the power generating operation, so that an occurrence of a failure due to a trouble in the current detector can be more reliably prevented.

The controller may be configured to switch the switch so as to supply the AC power from the system power supply to the electric power load and determine the direction of the current detected by the current detector, in response to turn-on of the controller. "In response to turn-on of the controller" as stated herein means "at the same time with turn-on of the controller or in conjunction with turn-on of the controller".

The power generation system may have a voltage lowering device on an electric path extending from the first DC/DC convertor to the switch configured to lower the voltage of the DC power of the first DC/DC convertor to a value that does not exceed the voltage of the system power supply. In this configuration, the electric path extending from the voltage lowering device to the switch and the electric path extending from the interconnection point to the switch have the same specification in terms of cross-sectional area, length and others.

The voltage lowering device may be constituted by a second DC/DC convertor configured to lower the voltage of the DC power of the power generator in accordance with an amount of surplus electric power of the power generator.

According to the invention, there is provided a method of operating a power generation system having a power generator configured to generate DC power; an electric power load; a current detector configured to detect a current flowing between a system power supply and an interconnection point; and a switch configured to switch to supply the DC power from the power generator or AC power which is fed from the system power supply through the interconnection point, to the electric power load, the method comprising the steps of: switching the switch so as to supply the AC power from the system power supply to the electric power load if a direction of the current detected by the current detector is to be determined; and switching the switch so as to supply the DC power from the power generator to the electric power load if surplus electric power has occurred in the power generator.

With this configuration, the cost of the current detector installation check can be reduced and a system interconnection failure can be properly coped with.

These objects as well as other objects, features and advantages of the invention will become apparent to those skilled in the art from the following description with reference to the accompanying drawings.

Effects of the Invention

The invention has the effect of saving the installation cost of the current detector in the power generation system of the above-described configuration, according to which DC power generated by the power generator is converted into AC power that is in turn output, while the power generation system being interconnected to the system power supply, and surplus electric power is supplied to the internal electric power load based on a current that is flowing between the system power supply and the interconnection point and detected by the current detector.

REFERENCE NUMERALS IN THE DRAWINGS

1: power generator
2: DC/DC convertor
3: DC/AC convertor
4: switch
5: internal electric power load
6: DC voltage lowering device
7: current detector
8: system power supply
9: interconnection point
10: controller
10a: retry counter
11: external AC power load
12: power supply wire
13: current detector
20: exhaust heat recovery pipe
20a: outgoing pipe
20b: returning pipe
21: heat accumulator
22: heat storage sensor
22A to 22D: temperature sensor
23: hot water supplier
24: faucet
25: heat storage data controller
31: display device
50: fuel cell system
51: fuel cell
52: material gas feeder
53: hydrogen generator
54: reformer
55: CO reducer
56: oxidizing gas feeder
57: power output terminal
58, 59: temperature sensor
100: power generation system

BEST MODE FOR CARRYING OUT THE INVENTION

Referring now to the accompanying drawings, preferred embodiments of the invention will be described. In all figures associated with the following embodiments, those parts that are substantially equivalent or function substantially similarly to one another are indicated by the same numerals and redundant explanation thereof is omitted.

(First Embodiment)

Figure 1:
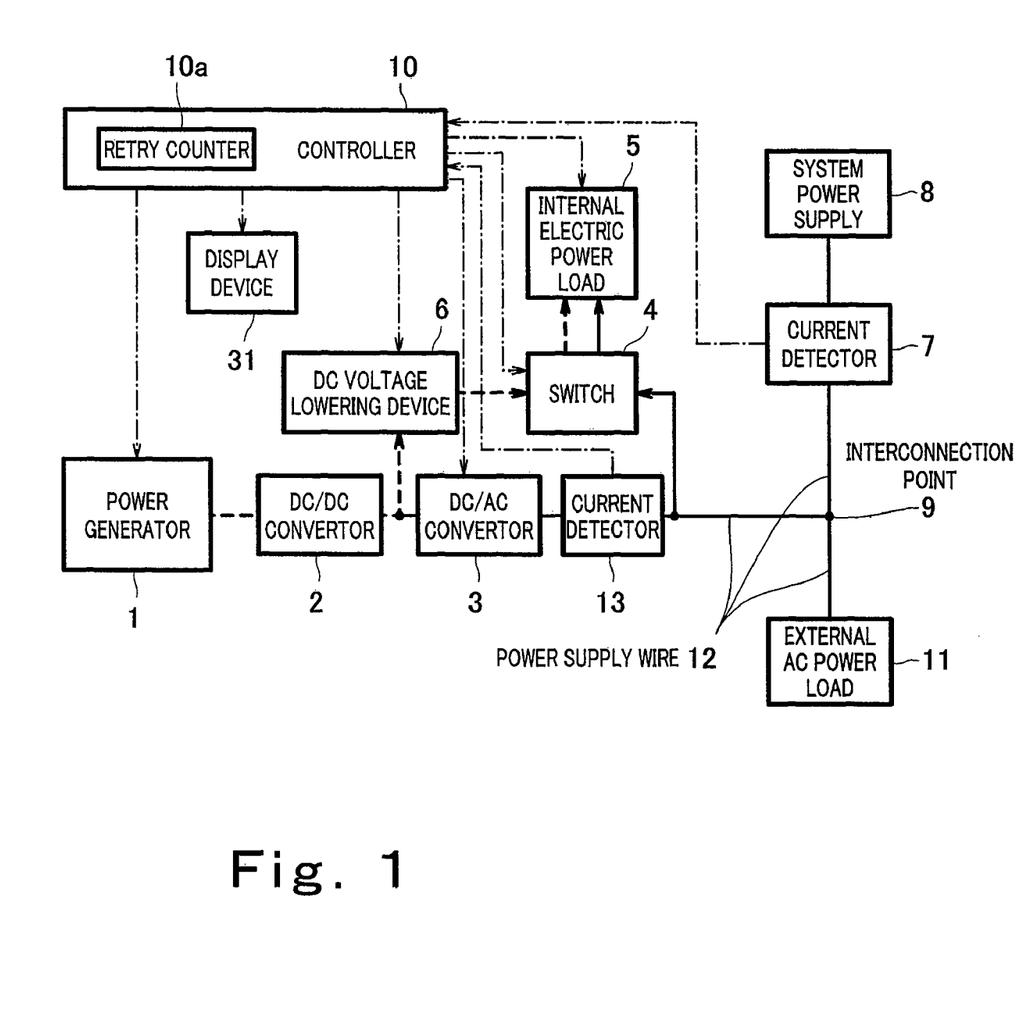
FIG. 1 is a block diagram schematically showing a configuration of a power generation system according to a first embodiment of the invention.

FIG. 1 is a block diagram schematically showing a configuration of a power generation system according to a first embodiment of the invention.

As shown in FIG. 1, the power generation system of the first embodiment has a power generator 1; a DC/DC convertor (first DC/DC convertor) 2; a DC/AC convertor 3; a switch 4; an internal electric power load 5; a DC voltage lowering device 6; a current detector 7; a controller 10; a current detector 13; and a display device 31.

The power generator 1 is constituted by a power generator for generating DC power. Herein, the power generator 1 is constituted by, for example, a fuel cell system. The fuel cell system will be described later. The DC/DC convertor 2 converts a voltage of DC power output from the power generator 1 into a power having a specified voltage. Herein, the DC/DC convertor 2 is constituted by, for example, a boost chopper and raises the voltage of the DC power output from the power generator 1 to a specified voltage (e.g., about 400V). The DC/AC convertor 3 converts the DC power output from the DC/DC convertor 2 into AC power. Herein, the DC/AC convertor 3 is constituted by, for example, an inverter composed of a semiconductor switching device. The output terminal of the DC/AC convertor 3 is connected to an interconnection point 9 connected to a system power supply 8, by way of a power supply wire 12. The system power supply 8 is, for example, a commercial power network owned by an electric power company. Connected to the interconnection point 9 is an external AC power load 11. The external AC power load 11 corresponds to a household electric power load composed of electric power consuming appliances for home use such as televisions and air conditioners. Thereby, the AC power output from the DC/AC convertor 3 is supplied to the external AC power load 11 while the power generation system being interconnected to the system power supply 8.

The current detector 7 is provided in a wire for connecting the system power supply 8 and the interconnection point 9. The current detector 7 is constituted by a current sensor such as CT (current transformer), configured to detect the magnitude and direction of the current flowing in the wire that connects the system power supply 8 and the interconnection point 9.

The DC voltage lowering device 6 is connected to the output terminal of the DC/DC convertor 2. The DC voltage lowering device 6 has two functions. The first function is for lowering the voltage (e.g., 400V) of the DC power output from the DC/DC convertor 2 to a voltage that does not exceed the voltage (200V) of the system power supply 8. With this function, when supplying DC power from the DC side of the internal electric power load 5, the current value of the DC power can be limited so as not to exceed the maximum current value when supplying AC power from the AC side. As a result, the electric path extending from the DC voltage lowering device 6 to the internal electric power load 5 can be designed to be equal to the electric path on the AC side, in terms of cross-sectional area and length. As a result, the electric path extending from the DC voltage lowering device 6 to the switch 4 and the electric path extending from the power supply wire 12 to the switch 4 have the same specification in terms of cross-sectional area, length and others.

The second function is for controlling the DC power to be supplied to the internal electric power load 5 by controlling the voltage to be lowered within the range that does not exceed the voltage of the system power supply 8. If only the first function is required, an electric appliance having a simple configuration capable of simply lowering DC voltage can be employed. However, the second function is required herein and therefore the DC voltage lowering device 6 is constituted by a DC/DC convertor (the second DC/DC convertor) having both the first and second functions. The rated voltage of the internal electric power load 5 is, for example, 200V. The output terminal of the DC voltage lowering device 6 is connected to either one of the input terminals of the switch 4. The other input terminal of the switch 4 is connected to the power supply wire 12 and the output terminal of the switch 4 is connected to the internal electric power load 5. The switch 4 selectively connects (by switching) the internal electric power load 5 to the DC voltage lowering device 6 and the power supply wire 12. The internal electric power load 5 is composed of a load operable with both DC and AC powers. Herein, the internal electric power load 5 is constituted by, for example, an electric heater. The internal electric power load 5 has a built-in switch (not shown) that is turned ON and OFF under the control of the controller 10 (described later). The current detector 13 is provided on the power supply wire 12 in a position between the connection point between the power supply wire 12 and the switch 4 and the connection point between the power supply wire 12 and the DC/AC convertor 3. The current detector 13 is constituted by a current sensor such as CT and detects the magnitude of a current flowing in this portion of the power supply wire 12.

The display device 31 is constituted by a display such as a touch panel and performs required displaying.

The controller 10 is constituted by a calculator such as a microcomputer and includes a calculating unit, a memory and an input device for receiving instructions and desired data (these components are not shown in the drawings). The controller 10 controls the display device 31 to display the result of processing on its screen. The controller 10 receives desired data to control the desired components of the power generation system, thereby controlling the overall operation of the power generation system. Herein, the "controller" as stated in the invention designates not only a single controller but also a group of controllers. Therefore, the controller 10 is not necessarily composed of a single controller but may be composed of a plurality of discrete controllers that perform control in cooperation.

Specifically, the controller 10 is provided with a retry counter 10a constructed by a specified program and receives current detection signals from the current detector 7 and the current detector 13. The controller 10 controls the operations of the power generator 1, the DC/AC convertor 3, the switch 4, the internal electric power load 5, the DC voltage lowering device 6 and the display device 31. Thereby, the controller 10 performs an installation check on the current detector 7 when installing the power generation system 1 and executes reverse power flow prevention and system interconnection failure recovery. These operations will be described later in detail.

Figure 5:
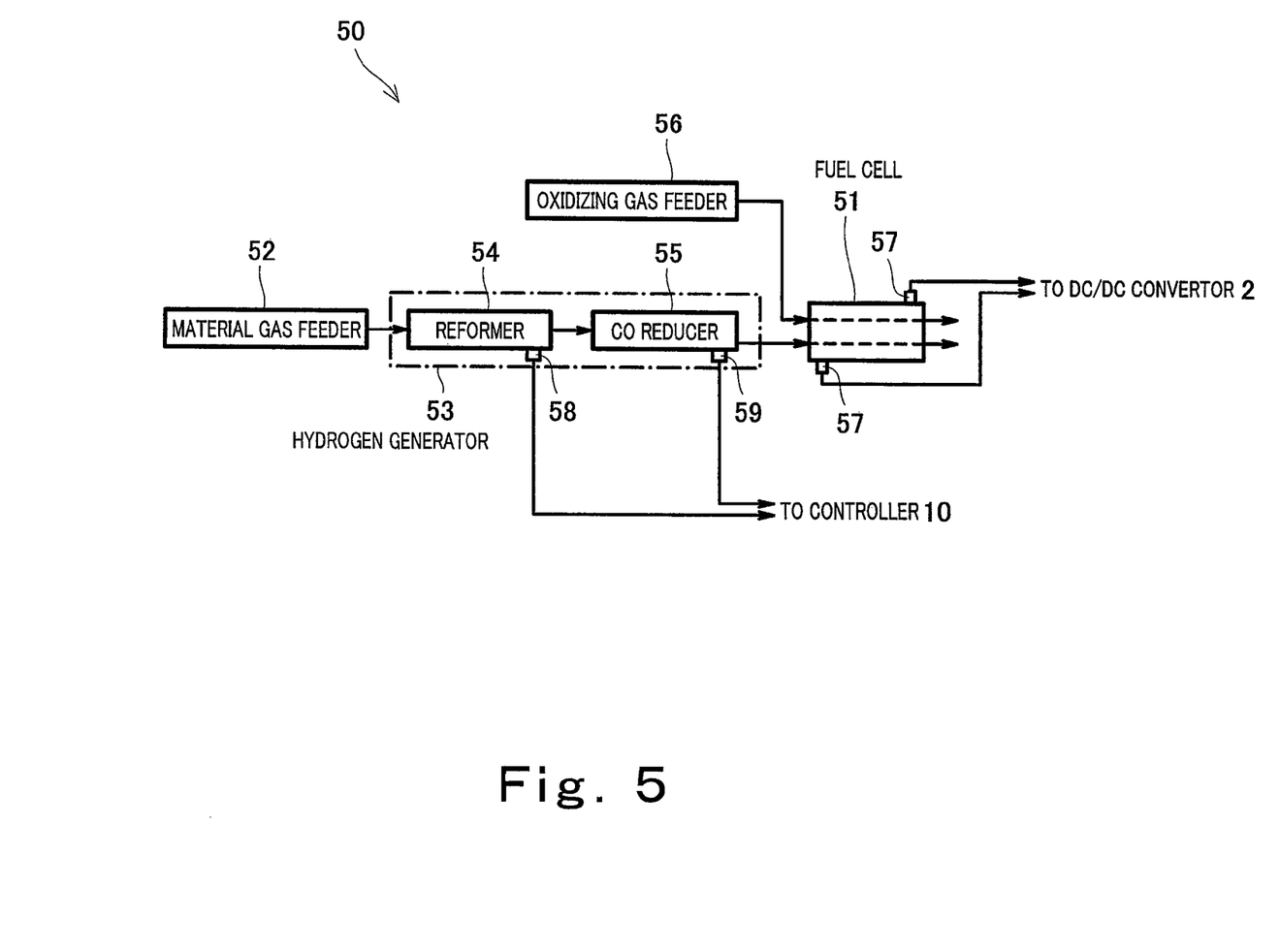
FIG. 5 is a block diagram schematically showing a fuel cell system that serves as a configuration example of the power generation system shown in FIG. 1.

Next, the fuel cell system will be explained which serves as a configuration example of the power generator 1. FIG. 5 is a block diagram schematically showing the fuel cell system that serves as a configuration example of the power generation system shown in FIG. 1.

As shown in FIG. 5, the fuel cell system 50 is constructed by known components. Therefore, the configuration and operation of the fuel cell system 50 will be briefly described herein. The fuel cell system 50 has a material gas feeder 52. The material gas feeder 52 is constituted by, for example, a plunger pump, for raising the pressure of material gas (e.g., city gas containing natural gas as a chief component) fed from a city gas infrastructure (not shown) to supply to a hydrogen generator 53. The hydrogen generator 53 is provided with a reformer 54 and a CO reducer 55. The reformer 54 reforms the material gas fed from the material gas feeder 52 to produce hydrogen-rich reformed gas. The CO reducer 55 reduces the CO concentration of the reformed gas produced by the reformer 54 to a specified level (that is generally 10 ppm or less). Specifically, the CO reducer 55 is constituted by at least either a shift convertor or a CO oxidizer. A shift convertor reduces the CO concentration of the reformed gas through a shift reaction. A CO oxidizer reduces the CO concentration of the reformed gas by oxidation. Herein, the CO reducer 55 is constituted by a shift convertor and a CO oxidizer. The reformed gas, the CO concentration of which has been reduced by the CO reducer 55, is supplied to the anode of the fuel cell 51 as a fuel gas. The fuel cell 51 is constructed by known components. The cathode of the fuel cell 51 is supplied with an oxidizing gas fed from an oxidizing gas feeder 56. The oxidizing gas feeder 56 is constituted by, for example, a blower or the like and sucks in outside air (air) to feed as the oxidizing gas. The fuel cell 51 generates electric power through a power generation reaction between the fed fuel gas and the oxidizing gas at the anode and the cathode. The fuel gas and oxidizing gas, which have not contributed to the power generation reaction, are respectively discharged to the outside of the fuel cell 51. The generated electric power is output from a power output terminal 57 to the DC/DC convertor 2 shown in FIG. 1. The fuel cell system 50 is provided with temperature sensors 58, 59 for detecting the temperatures of the shift convertor and the CO oxidizer, respectively. The temperatures of the shift convertor and the CO oxidizer detected by the temperature sensors 58, 59 respectively are input to the controller 10. The controller 10 determines that the CO concentration of the reformed gas has been reduced to the above-mentioned specified level by the CO reducer 55, if the temperatures of the shift convertor and the CO oxidizer input to the controller have reached their respective specified threshold values.

Next, the operation of the power generation system of the first embodiment having the above-described configuration will be described in detail. Since the general operation of the power generation system is commonly known, emphasis is placed upon the operation inherent to the invention in the following discussion.

Figure 6:
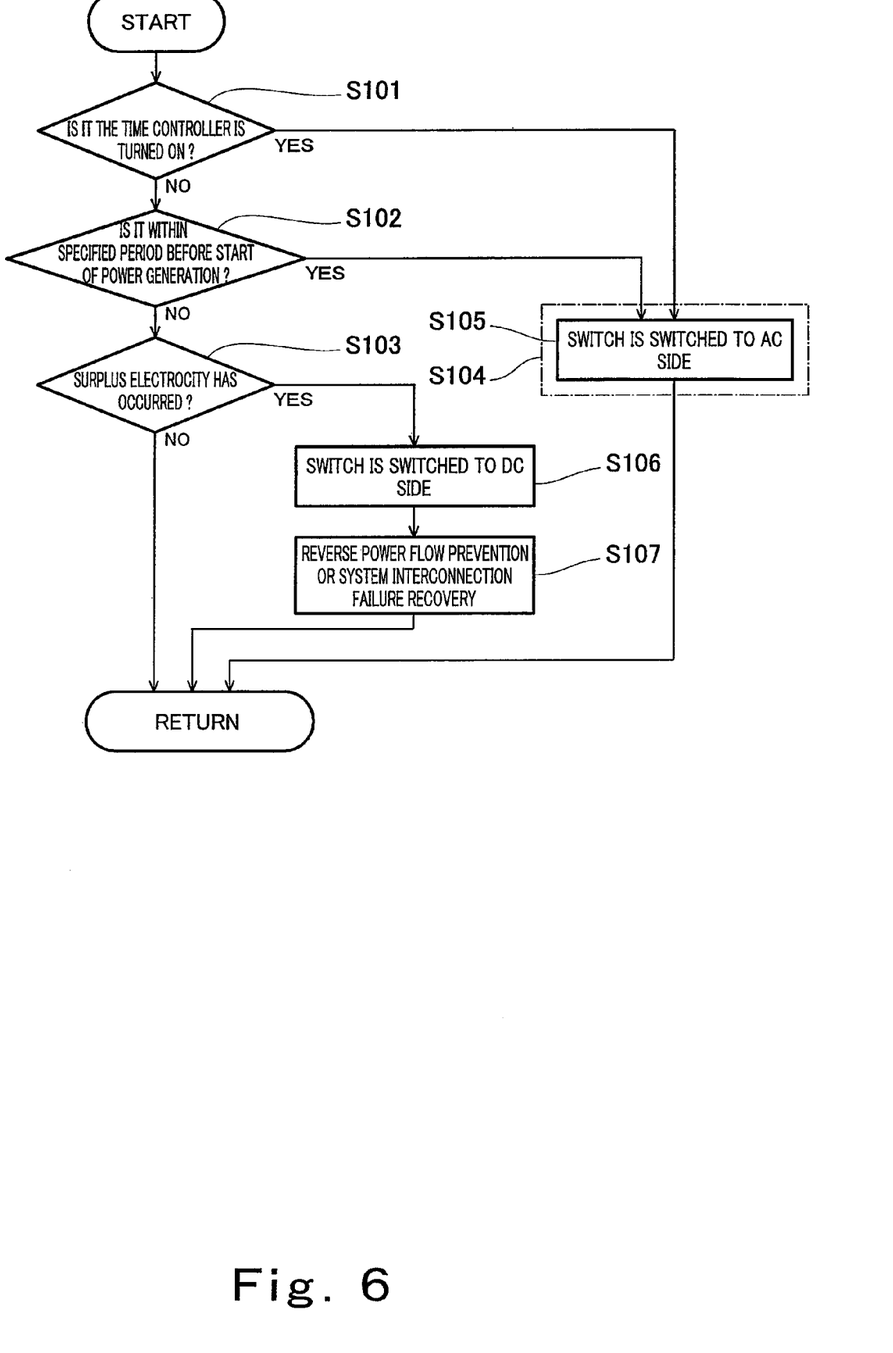
FIG. 6 is a flow chart showing a part of a control program for the power generation system shown in FIG. 1, the part being associated with a switch.

First, there will be explained the operation associated with the switch 4 that characterizes the invention. FIG. 6 is a flow chart showing a part of a control program for the power generation system shown in FIG. 1, the part being associated with the switch.

This control program is stored in the memory (not shown) of the controller 10 and the controller 10 controls the operation of the power generation system 1 by executing this program in the calculating unit.

As shown in FIG. 6, the controller 10 determines whether the current time is the time point at which the power supply of the controller 10 is turned ON (Step S101). Concretely, the power generation system 1 is connected to the system power supply 8 at the interconnection point 9 when installed (see FIG. 1). Thereby, the power supply of the controller 10 is turned ON (i.e., the controller 10 is turned ON). After turn-on of the power supply of the controller 10, the controller first performs initialization. Thereafter, individual processing is started. In this program, the controller 10 determines subsequently to the initialization whether the current time is the time point at which its own power supply is turned ON. If the controller 10 has made the above determination subsequently to the initialization, the controller 10 determines the current time is the time point at which the power supply of the controller 10 is turned ON. If not, it is determined that the current time is not the time point at which the power supply of the controller 10 is turned ON.

If the controller 10 determines that the current time is the time point at which the power supply of the controller 10 is turned ON (YES in Step S101), the installation check for the current detector 7 is made (Step S104) and in this check, the switch 4 is switched to the AC side (interconnection point 9 side) (Step S105). The details of the installation check for the current detector 7 (Step S104) will be described later in detail. Then, the program returns to START.

If the controller 10 determines that the current time is not the time point at which the power supply of the controller 10 is turned ON (NO in Step S101), it is then determined whether the current time is within a specified period before a start of power generation (Step S102). "A specified period before a start of power generation" as stated in the invention means "the period until the power generation of the fuel cell 51 starts after a start of the startup operation of the fuel cell system 50". It should be noted that this determination is made during "the specified period before a start of power generation" and, more preferably, during "the period until the power generation of the fuel cell 51 starts after the CO concentration of the reformed gas has been reduced to the above specified level (10 ppm or less) by the CO reducer 55". The determination on whether or not the CO concentration of the reformed gas has been reduced to the specified level by the CO reducer 55 is made by the controller 10 determining if the temperatures of the shift convertor and the CO oxidizer, which have been input to the controller 10, have reached their respective specified threshold values, as described earlier. It is also possible to determine whether the CO concentration of the reformed gas has been reduced to the specified level by the CO reducer 55 by the controller 10 monitoring the CO concentration detected by a concentration sensor that is provided for detecting the CO concentration of the reformed gas reduced by the CO reducer 55.

If the controller 10 determines that the current time is within the specified period before a start of power generation (YES in Step S102), the installation check for the current detector 7 is made (Step S104) and in this check, the switch 4 is switched to the AC side (interconnection point 9 side) (Step S105). Then, the program returns to START. There are some occasions when the current detector 7 is dismounted for carrying out electric work to install other electric appliances in a house. In this case, the current detector 7 may be installed in a wrong orientation when reinstalled. There is also a possibility that the current detector 7 develops trouble as time elapses after installation of the current detector 7. Therefore, the installation check for the current detector 7 is made (Step S104) during the "specified period before a start of power generation", thereby unfailingly preventing an occurrence of a malfunction caused by a failure in the current detector 7.

If the controller 10 determines that the current time is not within the specified period before a start of power generation (NO in Step S102), a check is then made to determine whether surplus electric power has been generated in the power generator 1 (Step S103).

If the controller 10 determines that surplus electric power has been generated in the power generator 1 (YES in Step S103), the switch 4 is then switched to the DC side (DC/DC convertor 2 side) (Step S106). Then, after the reverse power flow prevention or the system interconnection failure recovery is executed (Step S107), the program returns to START. If it is determined that no surplus electric power has been generated (NO in Step S103), the program immediately returns to START.

Next, the installation check for the current detector 7, the reverse power flow prevention and the system interconnection failure recovery, which are accompanied with the change-over of the switch 4, will be explained in order.

First, there will be explained the determination on whether the current detector 7 is properly oriented when the power generation system is installed.

Figure 2:
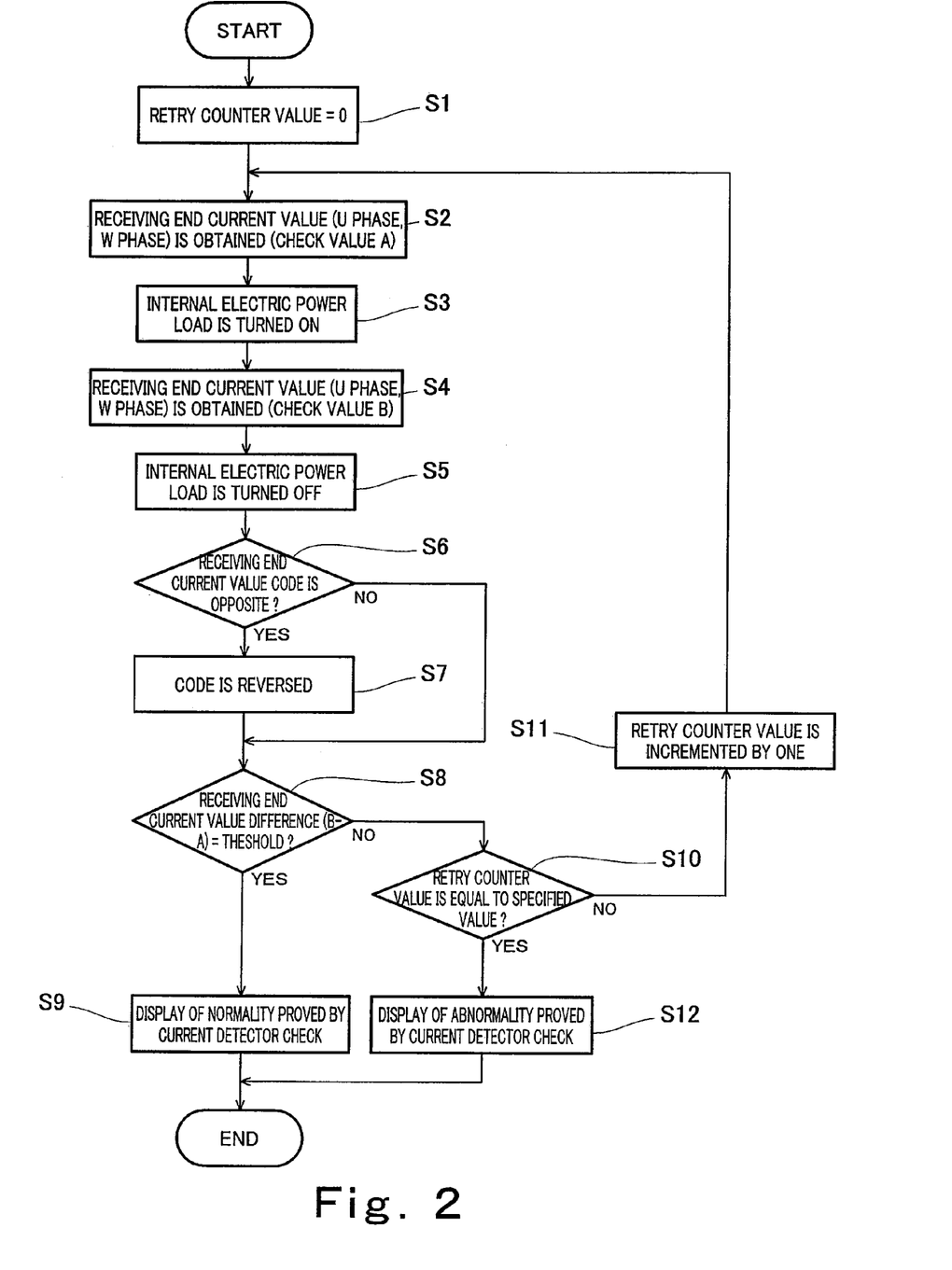
FIG. 2 is a flow chart showing the contents of a current detector installation check program stored in a memory of a controller of the power generation system shown in FIG. 1.

FIG. 2 is a flow chart that shows the contents of the installation check program for the current detector 7, the program being stored in the memory (not shown) of the controller 10. The controller 10 executes this program in its calculating unit, thereby making the installation check of the current detector 7.

In this embodiment, when installing the power generation system, the technical installation staff connects the current detector 7 (more particularly the primary detecting element of the current detector 7 (e.g., the detection coil of a CT (current transformer)) to the wire extending between the system power supply 8 and the interconnection point 9 and connects an output signal line to the controller 10. Thereafter, the installation check for the current detector 7 is made by the controller 10 in order to confirm that the installation has been properly done. In this installation check, not only the orientation of the primary detecting element of the current detector 7 but also required work operations such as wire are checked.

More concretely, as shown in FIGS. 1, 2, the controller 10 sets the count value (hereinafter referred to as "retry count value") of the retry counter 10a to zero (Step S1).

Subsequently, the controller 10 obtains the current value (hereinafter referred to as "receiving end current value") of the U phase and W phase among the three phase current received at the receiving end of the system power supply and detected by the current detector 7. The controller 10 stores this current value as a check value A (Step S2).

Thereafter, the controller 10 switches the switch 4 to connect the internal electric power load 5 to the power supply wire 12 and then turns the internal electric power load 5 ON (putting it into operation) (Step S3). It is apparent that the controller 10 brings the power generator 1 and the DC/AC convertor 3 to a stop at that time. The turn-on and turn-off of the internal electric power load 5 is carried out by the controller 10 operating a switch (not shown) built in the internal electric power load 5. Thereby, AC power is fed from the system power supply to the internal electric power load 5 (as indicated by solid arrow in FIG. 1).

Then, the controller 10 obtains the receiving end current value of the U phase and W phase at that time and stores it as a check value B (Step S4).

Subsequently, the controller 10 turns the internal electric power load 5 OFF (bringing it to a stop), after an elapse of a specified time after the internal electric power load 5 is turned ON (Step S5). The time elapsing between the turn-on of the internal electric power load 5 in Step S3 and the turn-off of the internal electric power load 5 in Step S4 (i.e., the ON period of the internal electric power load 5) is, for example, 0.1 sec.

Subsequently, the controller 10 makes a comparison between the code (the direction of current) of the check value B that is the receiving end current value of the U phase and W phase at the time of the turn-on of the internal electric power load and a specified code (the direction of current) of the receiving end current value of the U phase and W phase prestored in the memory, thereby determining whether or not the code of the check value B is opposite to the specified code (Step S6). If the code of the check value B is not opposite, the program proceeds to Step S8. Herein, the code of the check value B that is not opposite to the specified code indicates that the current detector 7 is installed in a correct orientation.

If the code of the check value B is opposite, the program proceeds to Step S7. Herein, the code of the check value B that is opposite to the specified code indicates that the current detector 7 is installed in an orientation opposite to the normal orientation. In Step S7, the controller 10 changes its settings such that the code of the receiving end current value of the U and W phases input from the current detector 7 is reversed and the reversed code is used from now on. Thereafter, the controller 10 reverses the code of the subsequently input receiving end current value of the U and W phases and performs the surplus electric power processing for the reverse power flow prevention and the system interconnection failure recovery, by use of the receiving end current value of the U phase and W phase whose code has been reversed. This eliminates the need for correcting the position of the current detector 7 in cases where the current detector 7 is installed in an orientation opposite to the normal orientation, so that the installation cost of the current detector 7 can be saved.

Then, in Step S8, the controller 10 determines whether the difference between the check value B and the check value A is not lower than a specified threshold value prestored in the memory (Step S9). Herein, the difference that is not lower than the specified threshold value indicates that the current detector 7 is normally installed. Therefore, if the difference is not lower than the specified threshold value, the controller 10 displays in the display device 31 that the current detector 5 is in a normal condition (Step S9) and then completes the check.

On the other hand, the difference lower than the specified threshold value indicates that there is a possibility that the current detector 7 is abnormally installed (e.g., wire unconnected state of the current detector 7 and disconnected state of the signal line of the current detector 7). Therefore, if the difference is lower than the specified threshold value, the controller 10 determines whether the retry counter value is not lower than a specified threshold value prestored in the memory (Step S9). If the retry counter value is determined to be lower than the specified threshold value, the retry counter value is incremented by one (Step S11) and then the program returns to Step S2.

From this on, the check is completed via Step S9 as described earlier, if it is determined in Step S8 that the difference between the check value B and the check value A is not lower than the specified threshold value. This case means that the installation of the current detector 7 is determined to be faulty by mistake in the first Step S8 because of external disturbances such as noise. Otherwise, the controller 10 repeats Steps S11, S2 to S8 and S10 until the retry counter value reaches the specified threshold value. After the retry counter value has reached the specified threshold value in Step S8, the display device 31 displays that the current detector 7 is in an abnormal condition (Step S12) and then the check is completed. In this way, it is determined that the installation of the current detector 7 is faulty. Therefore, the display of the abnormal condition of the current detector 7 by the display device 31 alerts the installation staff to check and correct the installed condition of the current detector 7. After completion of the correction of the installed condition of the current detector 7 by the installation staff, he inputs a specified command to the input device of the controller 10. This allows the controller 10 to perform the above-described installation check on the current detector 7 again. If it is still displayed that the current detector 7 is in an abnormal condition, the installation staff repeats the adjustment until the controller 10 displays that the current detector 7 is in a normal condition.

Next, there will be explained the reverse power flow prevention and the system interconnection failure recovery in the power generation system.

Upon receipt of a specified command (a command to start the power generation of the power generator 1 (e.g., power generation request)) by the input device, the controller 10 switches the switch 4 so as to connect the internal electric power load 5 to the DC voltage lowering device 6 (i.e., the switch 4 is switched to the DC side). Herein, the switch 4 may be switched to the DC side after surplus electric power occurs subsequently to reverse power flow or a system interconnection failure. It should be noted that the description "the switch 4 is switched to the DC side when surplus electric power occurs" in the foregoing discussion with reference to FIG. 6 means that the switch 4 has been already brought into a condition where the switch 4 is switched to the DC side at the time when the surplus electric power is supplied to the internal electric power load 5. Then, the controller 10 controls the overall power generation system 1 to thereby perform power generating operation. In the power generating operation, the DC power generated by the power generator 1 is boosted by the DC/DC convertor 2 and then converted into AC power by the DC/AC convertor 3 to be fed to the external AC power load 11. Basically, the controller 11 controls the power generator 1 so as to generate power in compliance with variations in the power consumption of the external AC power load 11. If the controller 11 fails in reacting to the variations with the result that the power consumption of the external AC power load 11 exceeds the amount of power generated by the power generator 1, the amount of power corresponding to the excessive amount of power consumption (i.e., deficit) is supplied from the system power supply 8 to the external AC power load 11 by way of the interconnection point 9. On the other hand, if the controller 11 fails in reacting to the variations with the result that the power consumption of the external AC power load 11 becomes lower than the amount of power generated by the power generator 1, the controller 10 executes the following reverse power flow prevention control.

The controller 10 monitors the code of the receiving end current value of the U and W phases detected by the current detector 7 (if the code has been reversed as described earlier, the reversed code is monitored), during the power generation of the power generator 1. This code indicates the direction of a current flowing from the system power supply 8 to the interconnection point 9 when power is supplied from the system power supply 8 to the external AC power load 11, but becomes indicative of the direction of a current flowing from the interconnection point 9 to the system power supply 8 when reverse power flow occurs. Therefore, if the code of the receiving end current value of the U and W phases indicates the direction of a current flowing from the interconnection point 9 to the system power supply 8, the controller 10 determines that reverse power flow has occurred. Then, the controller 10 turns the internal electric power load 5 ON while calculating surplus electric power based on the receiving end current value of the U and W phases input from the current detector 7, and controls the DC voltage lowering device 6 so as to output electric power corresponding to the calculated surplus electric power. Thereby, the surplus electric power, which has occurred in the power generator 1, is supplied to the internal electric power load 5 by way of the DC/DC convertor 2, the DC voltage lowering device 6 and the switch 4 (as indicated by dotted allow in FIG. 1) and consumed in the internal electric power load 5. Meanwhile, the controller 10 controls the power generator 1 to reduce the amount of power generated by the power generator 1 until the current detector 7 detects no reverse power flow (i.e., until an occurrence of reverse power flow is not determined from the code of the receiving end current value of the U and W phases). In this way, an occurrence of reverse power flow is prevented.

The controller 10 monitors the magnitude of the current value of the power supply wire 12 detected by the current detector 13 while the power generator 1 generating power. Concretely, the system interconnection failure is a power failure in the interconnection and if this occurs, an abnormal current momentarily flows from the DC/AC convertor 3 to the external AC power load 11 through the power supply wire 12. If the magnitude of the current value detected by the current detector 13 becomes equal to or higher than a specified threshold value, the controller 10 determines that a system interconnection failure (power failure) has occurred. Then, the controller 10 gate-blocks the DC/AC convertor 3 while turning the internal electric power load 5 ON. This gate block prevents application of the output voltage of the power generation system (more particularly, the DC/AC convertor 3) to the interconnection (the system power supply 8). Meanwhile, the power generator 1 cannot stop power generation at once because it has its own limit in responsibility, so that surplus electric power temporality occurs. However, the surplus electric power, which has occurred in the power generator 1, is supplied to the internal electric power load 5 by way of the DC/DC convertor 2, the DC voltage lowering device 6 and the switch 4 and consumed in the internal electric power load 5. Thus, the power generation system can adequately cope with the system interconnection failure.

Herein, emphasis is placed on the following point. If the consumption of the surplus electric power occurring during reverse power flow alone is taken into account, there is no need to supply DC power to the internal electric power load 5 from the power line (the output terminal of the DC/DC convertor 2 in this embodiment) located closer to the power generator 1 than the DC/AC convertor 3, and only the supply of AC power to the internal electric power load 5 from the power line (the power supply wire 12) on the output side of the DC/AC convertor 3 is enough. In this case, the switch 4 is not required. However, when considering the consumption of the surplus electric power generated both in the case of reverse power flow and in the case of a system interconnection failure, such a configuration cannot cope with, because the DC/AC convertor 3 is gate blocked in the event of an occurrence of a system interconnection failure in the above configuration, and the surplus electric power generated in the power generator 1 cannot be supplied to the internal electric power load 5 by this gate block. To solve this problem, the power generation system of this embodiment is configured such that DC power is supplied to the internal electric power load 5 from the power line closer to the power generator 1 than the DC/AC convertor 3, as discussed earlier. In cases where the power generator is constituted by a power generator having a gas engine, it generates power with good responsivity (response speed) to variations in the electric power load (output power) and therefore it can immediately stop power generation in the event of an occurrence of a system interconnection failure, generating no surplus electric power. Power generation systems using such a power generator can employ only such a configuration that AC power is supplied to the internal electric power load from the power line on the output side of the DC/AC convertor. In contrast with this, the configuration described above is indispensable for the power generator 1 that exhibits poor responsivity (poor response speed) to variations in the electric power load during power generation. The power generator 1 having poor responsivity is exemplified by fuel cells that take time in start-up and shut-down. In view of this, the invention is useful particularly for power generation systems provided with a fuel cell.

As described hereinabove, according to the power generation system of the first embodiment, the DC power from the power generation system and the AC power from the system power supply 8 can be selectively supplied to one internal electric power load 5 through the switch 4 so that the installation check for the current detector 7 and surplus power consumption can be carried out with one internal electric power load 5. In other words, the internal electric power load 5 originally provided for the purpose of surplus electric power consumption can be utilized for the installation check for the current detector 7. Therefore, this embodiment does not require an electric power load exclusively used for the installation check for the current detector 7 unlike the prior art and can therefore save the cost of the current detector installation check. In addition, the installation check for the current detector 7 can be automatically made and therefore simplified. Further, even if the current detector 7 is installed in an orientation opposite to the normal orientation, the control of the reverse power flow prevention and the system interconnection failure recovery can be carried out, which eliminates the need for correcting the wrong orientation of the current detector 7. As a result, the installation cost of the current detector 7 can be saved.

(Modification)

According to the configuration example discussed above, in the event that the current detector 7 is erroneously installed, the code of the current detected by the current detector 7 is reversed and used in the control, thereby eliminating the need for correction of the orientation of the current detector 7. In contrast with this, this modification is such that if the controller 10 determines that the code of the current detected by the current detector 7 is opposite to the normal direction, the controller 10 causes the screen of the display device 31 to display the direction of the current determined to be opposite together with an alerting message. Thereby, the installation staff is alerted that the current detector 7 has been installed in a wrong orientation. After looking at the message on the display, the installation staff corrects the orientation of the current detector 7.

(Second Embodiment)

Figure 3:
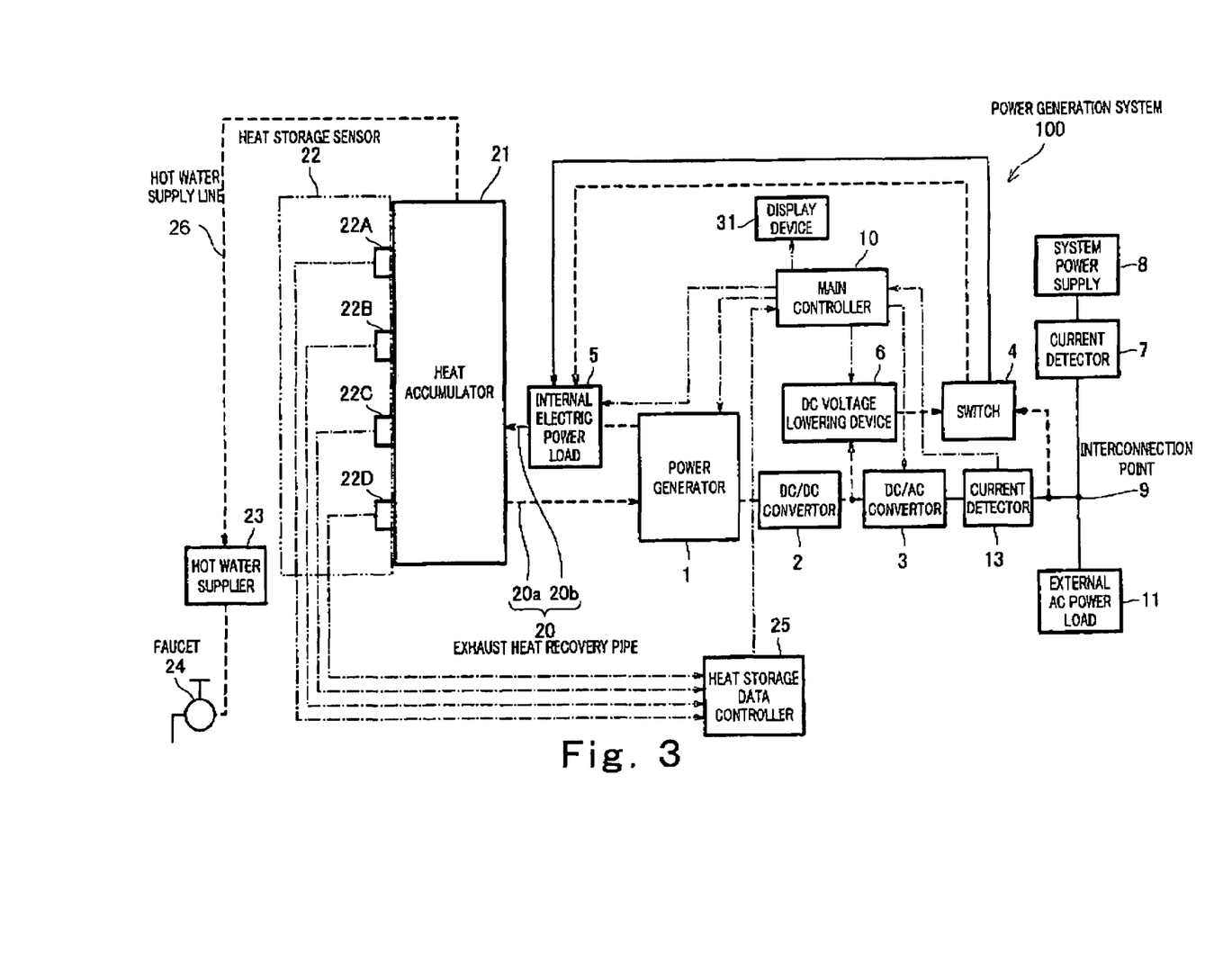
FIG. 3 is a block diagram schematically showing a configuration of a power generation system according to a second embodiment of the invention.

FIG. 3 is a block diagram schematically showing a configuration of a power generation system according to a second embodiment of the invention.

The power generation system of the second embodiment is associated with a concrete configuration of the internal electric power load 5 provided in the power generation system of the first embodiment. The basic structure of the power generation system of the second embodiment is the same as of the power generation system of the first embodiment and therefore only the difference between them will be described below.

In FIG. 3, the internal electric power load 5 is constituted by an electric heater. More specifically, the power generation system 100 of the second embodiment has a heat accumulator 21 and a heat storage data controller 25. Herein, the heat accumulator 21 is constituted by a so-called layered hot water tank. The heat accumulator 21 composed of the hot water tank and the power generator 1 are connected to each other by an exhaust heat recovery pipe 20. Formed within the power generator 1 is a heat medium flow passage (not shown). The exhaust heat recovery pipe 20 is composed of an outgoing pipe 20a and a returning pipe 20b. The lower part of the heat accumulator 21 is connected to the inlet of the heat medium flow passage of the power generator 1 by the outgoing pipe 20a, whereas the outlet of the heat medium flow passage of the power generator 1 is connected to the upper part of the heat accumulator 21 by the returning pipe 20b. The heat medium is circulated by a pump (not shown) so as to go out from the lower part of the heat accumulator 21 and return to the upper part of the heat accumulator 21 after passing through the outgoing pipe 20a the heat medium flow passage of the power generator 1 and the returning pipe 20b. Herein, the heat medium is warm water (hot water). The heat medium recovers the exhaust heat of the power generator 1, rising in temperature and this heat medium raised in temperature is accumulated in the heat accumulator 21 such that the stored heat medium gradually becomes higher in temperature from the bottom to the top. As a result, the exhaust heat of the power generator 1 is stored in the heat accumulator 21. Connected to the upper part of the heat accumulator 21 is the proximal end of a hot water supply line 26 the middle part and distal end of which are provided with a backup hot water supplier 23 and a faucet 24 serving as a hot water supply terminal, respectively. By opening the faucet 24, warm water serving as the heat medium is taken out from the heat accumulator 21 through the hot water supply line 26 to be used by the user. In the event that the heat medium in the heat accumulator 21 runs out, warm water (heat medium) is supplied from the hot water supplier 23 to the faucet 24 by the backup operation of the hot water supplier 23.

The returning pipe 20b of the exhaust heat recovery pipe 20 is provided with an electric heater that serves as the internal electric power load 5. Therefore, if the electric heater is turned ON, the temperature of the heat medium flowing in the returning pipe 20b is raised by the electric heater. As a result, the surplus electric power is converted into heat and stored in the heat accumulator 21 for efficient use.

The heat accumulator 21 is further provided with a heat storage sensor 22. The heat storage sensor 22 has a plurality of temperature sensors (four temperature sensors herein) 22A, 22B, 22C, 22D. The plurality of temperature sensors 22A, 22B, 22C, 22D each composed of e.g., a thermistor are arranged at specified intervals in a vertical direction on a side wall of the heat accumulator 21 constituted by a hot water tank. Temperatures detected by the plurality of temperature sensors 22A, 22B, 22C, 22D are input to the heat storage data controller 25. The heat storage data controller 25 calculates the amount of heat stored in the heat accumulator 21 based on the temperatures detected by the temperature sensors 22A, 22B, 22C, 22D and the volumetric capacities of the portions of the heat accumulator 21, the portions corresponding to the respective vertical locations where the temperature sensors are situated. This calculated amount of heat is output to the controller 10. The controller 10 controls the power generation of the power generator 1 based on the amount of stored heat and stops the power generation when the amount of stored heat becomes equal to or higher than a threshold value corresponding to the full capacity of the heat accumulator 21.

Next, there will be explained the operations of the power generation system of the above-described configuration, associated with the current detector installation check, the reverse power flow prevention and the system interconnection failure recovery.

The current detector installation check of the second embodiment is basically the same as of the first embodiment (see the flow chart of FIG. 2) except the following point.

That is, in Steps S3 to S4 of the flow chart of FIG. 2, the controller 10 momentarily turns ON and OFF the electric heater 5 that serves as the electric power load 5 and the controller 10 receives receiving end current values from the current detector 7 at the time of the turn-on (Step S2) and at the time of the turn-off (Step S3). The reason for doing this is that since electric power load 5 is an electric heater and the heat medium is heated by the electric heater while the power generation system 100 is stopped with the heat medium being uncirculated, the energizing period is shortened to prevent excessive heating of the heat medium within the exhaust heat recovery pipe 20. In addition, the electric heater is a resistance load and therefore the controller 10 treats only the changes in effective electric power as the changes in the receiving end current value caused by turn-on and turn-off of the electric heater. By doing so, the construction cost of the current detector 7 can be saved like the first embodiment and the installation check for the current detector 7 can be simplified.

The reverse power flow prevention operation and the system interconnection failure recovery operation of the second embodiment are basically the same as of the first embodiment, except that the electric power consumed by the electric heater 5 serving as the electric power load 5 is transmitted as heat to the heat medium within the exhaust heat recovery pipe 20 and stored in the heat accumulator 21. Thereby, the surplus electric power is effectively utilized, resulting in an improvement in the energy saving performance of the power generation system 100.

As described hereinabove, the power generation system of the second embodiment achieves not only the effect of the first embodiment but also effective utilization of surplus electric power that occurs during reverse power flow and during an occurrence of a system interconnection failure.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function maybe varied substantially without departing from the spirit of the invention.

Industrial Applicability

The power generation system of the invention is designed to convert DC power generated in the power generator into AC power that is in turn output while the power generation system being interconnected to a system power supply and to supply surplus electric power to the internal electric power load based on a current flowing between the system power supply and the interconnection point which current is detected by a current detector. Therefore, the invention is useful as a power generation system or the like that enables a reduction in the construction cost of the current detector.

The invention claimed is:

1. A method of operating a power generation system, the method comprising steps of:
   (a) determining a direction of a current, which flows between a system power supply and an interconnection point of the power generation system and a power line from the system power supply, detected by a current detector, in a state where AC power from the system power supply is supplied to an electric power load by switching of a switch, the AC power being supplied to the electric power load through the switch; and
   (b) supplying surplus electric power of a power generator, in a state where DC power from the power generator is supplied to the electric power load by switching of the switch, the DC power being supplied to the electric power load through the switch.

2. The method according to claim 1, wherein:
   the power generation system includes a first DC/DC convertor configured to receive the DC power from the power generator and to convert a voltage thereof; and a DC/AC convertor configured to convert an output of the first DC/DC convertor into AC power, and
   the step (b) includes:
   (b1) electrically connecting the electric power load to an output side of the first DC/DC convertor through the switch so that the DC power output from the first DC/DC convertor is supplied to the electric power load through the switch.

3. The method according to claim 2, wherein the step (b) includes:
   (b2) lowering a voltage of the DC power output from the first DC/DC convertor to a value that does not exceed voltage of the system power supply, using a voltage lowering device provided on an electric path between the first DC/DC convertor and the switch.

4. The method according to claim 3, wherein the voltage lowering device is constituted by a second DC/DC convertor configured to lower the voltage of the DC power output from the first DC/DC convertor in accordance with an amount of surplus electric power of the power generator.

5. The method according to claim 2, wherein in the step (b1), the DC power output from the first DC/DC convertor is supplied to the electric power load through the switch without being supplied to the DC/AC convertor.

6. The method according to claim 1, further comprising a step of:
   (c) detecting a current flowing from the interconnection point to the system power supply based on the current detected by the current detector, wherein the step (b) is performed when the current flowing from the interconnection point to the system power supply is detected in the step (c).

7. The method according to claim 6, further comprising a step of:
   (e) reversing the direction of the current detected by the current detector when the direction of the current that has been determined in step (a) is opposite to a predetermined current direction,
   wherein the step (c) is performed based on the current reversed in the step (e).

8. The method according to claim 6, wherein in the step (b), the switch is switched to supply the DC power from the power generator to the electric power load during when the current flowing from the interconnection point to the system power supply is detected in the step (c).

9. The method according to claim 1, further comprising a step of:
   (d) displaying in a display device data relating to the direction of the current that has been determined in the step (a).

10. The method according to claim 1, wherein:
    the power generation system includes a heat accumulator configured to store a heat medium that has recovered exhaust heat of the power generator, and
    the electric power load is an electric heater for heating the heat medium.

11. The method according to claim 1, wherein:
    the power generation system is a fuel cell system, and
    the step (a) is performed during a period between a start of a start-up operation of the fuel cell system and a start of power generation.

12. The method according to claim 11, wherein:
    the fuel cell system includes: a hydrogen generator having a reformer configured to generate a hydrogen-rich reformed gas from a material gas and a CO reducer configured to reduce CO concentration of the reformed gas produced by reforming by the reformer; and a fuel cell configured to generate electric power by use of the reformed gas the CO concentration of which has been reduced, and the step (a) is performed during a period until the fuel cell starts power generation after the CO concentration of the reformed gas which has been reduced by the CO reducer reaches a specified level.

13. The method according to claim 1, wherein:

the power generation system ncludes a controller, and the step (a) is performed, in response to turn-on of the controller.

14. The method according to claim 1, further comprising a step of determining whether the current detector is properly installed or the current detector normally operates.

15. The method according to claim 1, wherein in the step (a), the power generation system does not generate power.

16. The method according to claim 1, wherein an external AC electric power load is connected to the interconnection point.

* * * * *